US008007098B2

(12) United States Patent
Yamada

(10) Patent No.: US 8,007,098 B2
(45) Date of Patent: Aug. 30, 2011

(54) INKJET PRINTER AND PRINTING METHOD

(75) Inventor: Ryuji Yamada, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 400 days.

(21) Appl. No.: 12/181,091

(22) Filed: Jul. 28, 2008

(65) Prior Publication Data

US 2009/0195626 A1 Aug. 6, 2009

(30) Foreign Application Priority Data

Jan. 31, 2008 (JP) ................................. 2008-021222

(51) Int. Cl.
*B41J 2/01* (2006.01)
*G01D 11/00* (2006.01)

(52) U.S. Cl. .................. 347/102; 347/5; 347/7; 347/16; 347/95; 347/100; 347/101

(58) Field of Classification Search .................... 347/16, 347/100, 101, 102
See application file for complete search history.

(56) References Cited

U.S. PATENT DOCUMENTS

| | | | | | |
|---|---|---|---|---|---|
| 5,220,346 | A * | 6/1993 | Carreira et al. | ............... | 347/102 |
| 5,371,531 | A * | 12/1994 | Rezanka et al. | ................ | 347/43 |
| 5,563,644 | A * | 10/1996 | Isganitis et al. | ............... | 347/102 |
| 5,631,685 | A * | 5/1997 | Gooray et al. | ................ | 347/102 |
| 6,808,583 | B2 * | 10/2004 | Kwasny et al. | ............... | 156/230 |
| 2003/0231234 | A1 * | 12/2003 | Ushirogouchi et al. | ...... | 347/100 |
| 2004/0080593 | A1 * | 4/2004 | Wotton et al. | ................. | 347/100 |

FOREIGN PATENT DOCUMENTS

JP 2007-160546 6/2007

* cited by examiner

*Primary Examiner* — Ryan Lepisto

(74) *Attorney, Agent, or Firm* — Ditthavong Mori & Steiner, P.C.

(57) ABSTRACT

An inkjet printer using solvent ink containing an organic solvent and a colorant. The inkjet printer includes an inkjet head configured to eject the solvent ink to a medium, and a microwave irradiation unit configured to irradiate the medium, to which the solvent ink was ejected, with microwaves.

23 Claims, 2 Drawing Sheets

INKJET PRINTER AND PRINTING METHOD

CROSS-REFERENCE TO RELATED APPLICATION

The present application claims priority to Japanese Patent Application No. 2008-021222, filed on Jan. 31, 2008, the entire contents of which are herein incorporated by reference.

BACKGROUND OF THE INVENTION

1. Field of the Invention

The present invention relates to inkjet printing apparatuses and methods.

2. Discussion of the Background

Conventionally, inkjet printers are known that use solvent ink for printing. (See, e.g., JP-A-2007-160546.) In such an inkjet printer, the ink is fixed, for example, by heating a medium after the ink is ejected. Conventionally, a heater having a heating element for heating has been used to heat the medium during fixing of the ink. For example, the inkjet printer described in JP-A-2007-160546 uses a conductive layer, provided on a platen, as the heating element. In this case, the conductive layer produces heat by generating eddy current in the conductive layer so as to heat the medium.

Recently, a variety of media are used for inkjet printers. When heating a medium using a heater as in the conventional method, the medium may be heated at a temperature over its allowable temperature limit so as to affect the medium, depending on the material of the medium. However, if the temperature of the heater is lowered, it is necessary to heat the medium for a longer time period so as to decrease the throughput of the printing. Therefore, for example, it is sometimes difficult to suitably fix the solvent ink.

For example, inkjet printers using solvent ink have recently been used to print on fibrous media. However, in the conventional case of fixing the solvent ink by heating the medium with a heater, an aftertreatment is required that includes heating with steam (steaming), for example, when printing on such fibrous media in order to develop the color of the ink, in addition to heating with the heater. Therefore, when using the conventional printing method to print on a fibrous medium using an inkjet printer, many treatments should be performed after ejection of ink, thus increasing the cost. Furthermore, an apparatus for heating with steam is a large-scale apparatus, because it is provided with effluent treatment facilities. Therefore, in a case where heating with steam is required, the cost of the apparatus itself is significantly increased. In addition, the space in which the inkjet printer is to be installed may be limited. Accordingly, when printing on a fibrous medium, it is strongly desired to fix the solvent ink to the medium without an aftertreatment such as heating with steam.

Thus, it is desired to provide an inkjet printer and a printing method capable of solving the aforementioned problems.

SUMMARY OF THE INVENTION

The present invention advantageously provides an embodiment of an inkjet printer using solvent ink containing an organic solvent and a colorant, where the inkjet printer includes an inkjet head configured to eject the solvent ink to a medium, and a microwave irradiation unit configured to irradiate the medium, to which the solvent ink was ejected, with microwaves.

The present invention also advantageously provides an embodiment of an inkjet printer using solvent ink containing an organic solvent and a colorant, where the inkjet printer includes means for ejecting the solvent ink onto a medium, and means for irradiating the medium, to which the solvent ink was ejected, with microwaves.

The present invention also advantageously provides an embodiment of a printing method using solvent ink containing an organic solvent and a colorant, where the method includes ejecting the solvent ink to a medium using an inkjet method, and irradiating the medium, to which the solvent ink was ejected, with microwaves.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF EMBODIMENTS OF THE INVENTION

Figure 1:
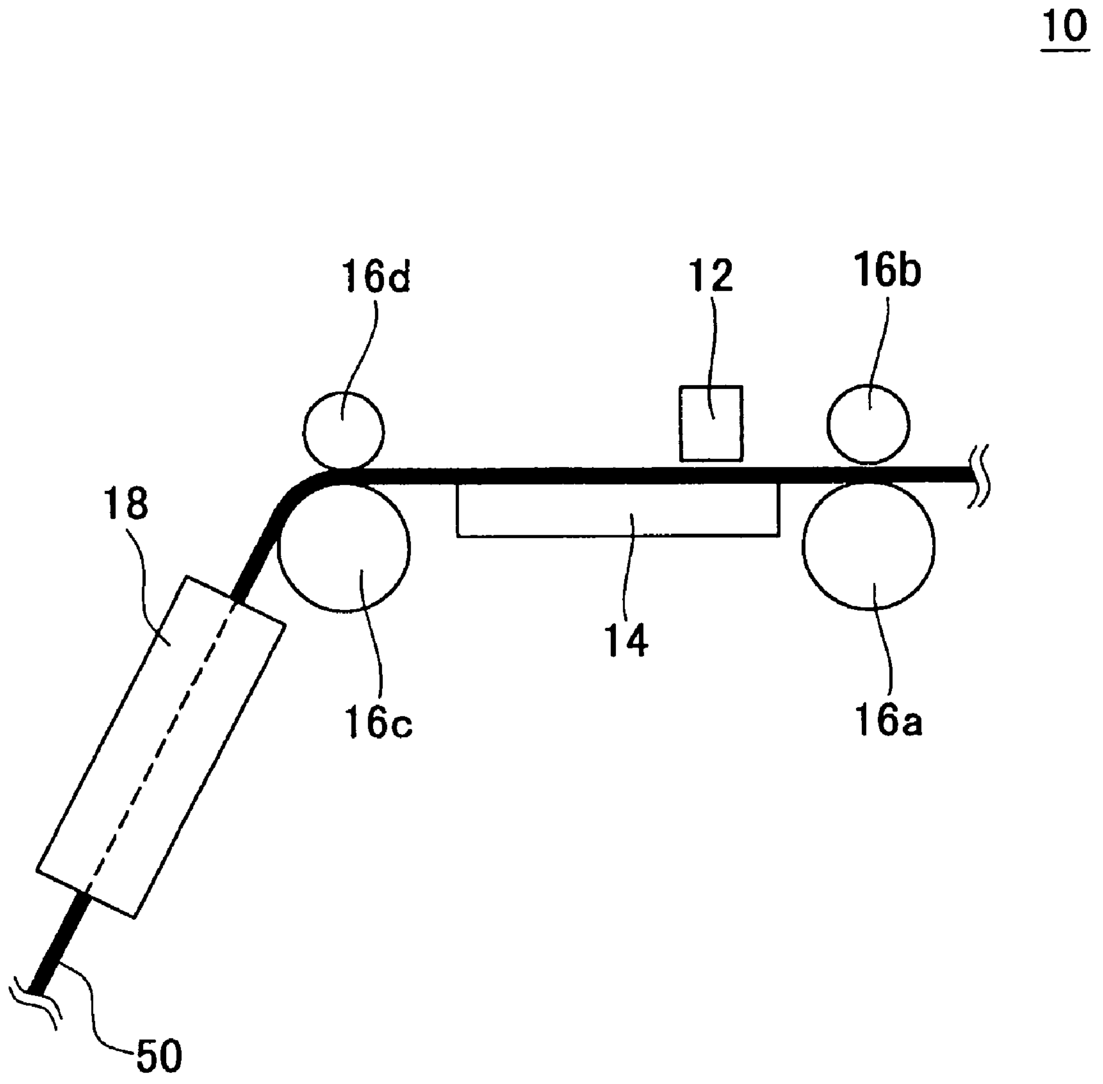
FIG. 1 is an illustration showing a structural example of an inkjet printer according to an embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The inventor of the present invention has keenly examined and found that it is possible to fix solvent ink containing an organic solvent as solvent to a medium by irradiation with microwaves. Thus, the present invention advantageously provides embodiments that solve the aforementioned problems.

In a first arrangement, an inkjet printer using solvent ink containing an organic solvent and a colorant is provided, which includes an inkjet head for ejecting the solvent ink to a medium, and a microwave irradiation unit for irradiating the medium, to which the solvent ink was ejected, with microwaves. For example, the microwave irradiation unit fixes the solvent ink to the medium by irradiation with microwaves.

In a case where a heater having a heating element for heating is used to dry ink, influence over the medium must be increased by heat because the ink is heated indirectly by heating the entire medium. However, according to the aforementioned first arrangement, materials contained in the solvent ink are affected directly by the microwaves. Accordingly, the first arrangement can suitably fix the solvent ink, while preventing the negative influence on the medium.

In a second arrangement, a medium is provided that is a fibrous medium. An example of the fibrous medium includes a fabric. The fibrous medium can be made of polyester fibers.

As a result of keen examination, the inventor of the present invention found that irradiation of solvent ink with microwaves enables suitable printing without the need for heating with steam. For example, even when using solvent ink containing a colorant of which color is developed by heating, the color of the colorant can be suitably developed without heating with steam. This can also eliminate the need for an apparatus for heating with steam, thereby increasing the degree of freedom of installation layout of the inkjet printer. Therefore, this arrangement can achieve suitable printing to a fibrous medium at lower cost.

In a third arrangement, a solvent ink is provided that contains a colorant of which color is developed by heating and the microwave irradiation unit develops the color of the colorant by irradiating the medium with microwaves. The solvent ink may be a sublimation ink.

In a case where such solvent ink is used, it is required to heat the ink in order to develop the color of colorant. If the medium is heated by using a conventional heater to develop the color of colorant, then the influence on the medium by heat is increased. However, this arrangement can heat the solvent ink to develop the color of the colorant, while preventing the influence on the medium.

In a fourth arrangement, an organic solvent is provided that is incompatible with water and the solvent ink contains water within a range allowing mixing with the organic solvent and a range of from 0.1 to 20%. This arrangement can suitably fix the solvent ink to the medium by irradiation with microwaves.

In a fifth arrangement, a printing method using solvent ink containing an organic solvent and a colorant is provided, which includes an ejection step for ejecting the solvent ink to a medium in an inkjet method, and a microwave irradiation step for irradiating the medium, to which the solvent ink was ejected, with microwaves. This arrangement can provide the same effects as the first arrangement.

According to the present invention, it is possible to suitably fix solvent ink to a medium in a case of printing in an inkjet method with solvent ink.

Hereinafter, an embodiment according to the present invention will be described with reference to the attached drawings. FIG. 1 is an illustration showing a structural example of an inkjet printer 10 according to an embodiment of the present invention. The inkjet printer 10 is an inkjet printer using solvent ink containing an organic solvent and a colorant and comprises an inkjet head 12, a platen 14, a plurality of rollers 16*a* through 16*d* (i.e., 16*a*, 16*b*, 16*c*, and 16*d*), and a microwave irradiation unit 18.

The inkjet head 12 is a print head for ejecting solvent ink to a medium 50. The inkjet head 12 ejects the solvent ink to respective places on the medium 50 while moving relative to the medium 50 in a predetermined main-scanning direction and a predetermined sub-scanning direction.

The platen 14 is a table for holding the medium thereon, to which the solvent ink is ejected from the inkjet head 12. The plurality of rollers 16*a* through 16*d* is rollers for feeding the medium 50. The plurality of rollers 16*a* through 16*d* feed the medium 50 so that the inkjet head 12 is practically moved relative to the medium 50 in the sub-scanning direction.

The microwave irradiation unit 18 is located on a downstream side of the inkjet head 12 in the feeding direction of the medium 50 and irradiates the medium 50, to which the solvent ink was ejected, with microwaves. In this embodiment, the microwave irradiation unit 18 irradiates the medium 50 with microwaves while passing the medium 50 through the inside of a chassis covered by wire mesh. The microwave irradiation unit 18 thus fixes the solvent ink ejected from the inkjet head 12 to the medium 50.

In this embodiment, for example, the solvent ink can be heated directly by microwaves. Therefore, this enables the solvent ink to be dried and to be suitably fixed to the medium 50 while preventing the influence on the medium 50.

The microwaves are electric waves with frequencies between 300 MHz and 30 GHz (wavelengths between 1 cm and 1 m). For example, the microwave irradiation unit generates microwaves with radio frequencies between 1 GHz and 4 GHz, preferably between 2 GHz and 4 GHz. The microwave irradiation unit 18 generates microwaves as strong as that, for example, generated by a household microwave oven.

The microwave irradiation unit 18 may send air to the medium 50 when irradiating the medium 50 with microwaves. This arrangement enables faster fixing of the solvent ink.

Hereinafter, the solvent ink and the medium 50 will be described in further detail. In this embodiment, the solvent ink contains an organic solvent which is incompatible with water. "Incompatible with water" means having a property that when a certain amount or more of the organic solvent is added into water, the mixture is separated into two layers. The boiling point of the organic solvent is, for example, 80° C. or more. As such an organic solvent, an organic solvent selected from a group including glycol ether compounds and glycol ester compounds may be employed.

The solvent ink of this embodiment contains water within a range allowing mixing with the organic solvent and a range of from 0.1 to 20%. According to this embodiment, the solvent ink can be suitably dried by irradiation with microwaves.

The solvent ink of this embodiment may be a sublimation ink containing a colorant of which color is developed by heating. In this case, the microwave irradiation unit 18 develops color of the colorant by irradiating the medium 50 with microwaves. According to this embodiment, it is possible to suitably develop color of the colorant contained in the solvent ink by heating the solvent ink while preventing the influence over the medium 50. This may be because the irradiation with microwaves increases amorphous areas in the material of the medium 50 and the colorant penetrates the amorphous areas.

The colorant contained in the solvent ink may be a pigment or dye. The solvent ink may contain a resin in addition to the organic solvent and the colorant. As the resin, a resin such as poly vinyl chloride acetate, acrylic resin, polyester, polyurethane may be employed.

The medium 50 is a sheet-like substrate as a subject to be printed. The medium 50 is preferably a non-metallic sheet-like substrate. In this embodiment, the medium 50 is a fibrous medium such as a fabric which may be made of polyester fibers. According to this embodiment, it is possible to suitably conduct printing on the fibrous medium 50 without aftertreatment such as heating with steam, for example. This also can eliminate the need for an apparatus for heating with steam, thereby achieving low-cost printing on fibrous media.

The medium 50 may be a polyvinyl chloride sheet, a polyolefin sheet, or the like. If the medium 50 is such a kind of sheet, the medium 50 is easily deformed by heating. For example, in a case where a polyvinyl chloride medium 50 is used, the medium 50 may become curled when the medium 50 is heated for drying the solvent ink. However, in a case where the inkjet printer 10 of this embodiment is used, the solvent ink is dried by irradiation with microwaves, thereby preventing an increase in temperature of the medium 50. This suitably prevents the medium 50 from being deformed.

Hereinafter, the present invention will be described in further detail with reference to Examples 1-3 and Comparative Examples 1-3.

For Examples 1 through 3, inkjet printers manufactured by Mimaki Engineering Co., Ltd were used as the inkjet printer to conduct printing. The inkjet printer used in Examples 1 and 2 was of model number JV33. The inkjet printer used in Example 3 was of model number JV5. A household microwave oven was used as the microwave irradiation unit instead of the microwave irradiation unit 18 provided in the body of the inkjet printer 10.

In each of Examples 1 through 3, solvent ink manufactured by Mimaki Engineering Co., Ltd was used. The solvent inks used in respective Examples were of model number ES3 (Example 1), SS21 (Example 2), and HS (Example 3). Vinyl chloride white glossy paper with release paper was used as the medium 50.

Printing according to Examples 1 through 3 was conducted under the aforementioned conditions. In this printing, the solvent ink was ejected to have 400% print density by the inkjet printer 10, and, after that, irradiation of the medium 50 with microwaves was conducted for two minutes by using the microwave oven. The output of the microwave oven was 600 W.

In Comparative Examples 1 through 3, printing was conducted in the same manner except that an electrical hot plate was used to dry the solvent ink instead of the microwave oven used as the microwave irradiation unit 18. The heating by the electrical hot plate was carried out at 55° C. for two minutes.

Evaluation of the Results:

First, the evaporation rate of the ink in the medium 50, to which the printing according to each of Examples and Comparative Examples was conducted, was measured in the same manner as a known method usually used for evaluating ink for inkjet printers. The evaporation rates of respective Examples were 3.8575 mg/s (Example 1), 3.4192 mg/s (Example 2), and 3.6458 mg/s (Example 3). On the other hand, the evaporation rates in respective Comparative Examples were 0.5761 mg/s (Comparative Example 1), 0.7244 mg/s (Comparative Example 2), and 0.6206 mg/s (Comparative Example 3). Accordingly, it is confirmed that the evaporation rate of ink in Examples 1 through 3 is significantly higher than that of Comparative Examples 1 through 3 and that the drying of the solvent ink was well conducted. This may be because the inside of the medium 50 can be directly heated by microwaves in Examples 1 through 3.

As for Examples 1 through 3, the evaporation rate of ink in the medium 50 without the release paper was also measured. In this case, the evaporation rates of respective Examples were 3.7364 mg/s (Example 1), 3.3986 mg/s (Example 2), and 3.6183 mg/s (Example 3). Accordingly, it was confirmed that there was no significant difference in evaporation rate in each Example between the case with the release paper and the case without the release paper. It was also found that the drying of the solvent ink in each Example was a result of irradiation with microwaves, not a result of heating by heat produced in the release paper.

Figure 2A:
FIGS. 2A-2C are pictures of three Examples and FIGS. 2D-2F are pictures of three Comparative Examples each showing the state of a medium after solvent ink is dried and a release paper is released.
Figure 2B:
Figure 2C:
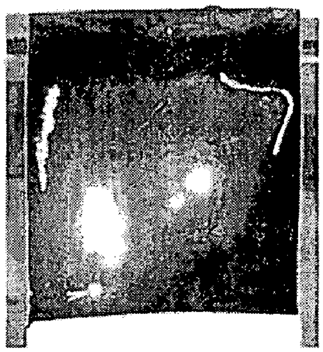
Figure 2D:
Figure 2E:
Figure 2F:

Then, the deformation of the medium 50 caused while drying the solvent ink was evaluated. FIGS. 2A-2F show a state of the medium 50 after the solvent ink was dried and the release paper was released in each of Examples 1-3 (FIGS. 2A-2C, respectively) and Comparative Examples 1-3 (FIGS. 2D-2F, respectively). In Examples 1 through 3 shown in FIGS. 2A-2C, respectively, there was no or little deformation of the medium 50. On the other hand, in Comparative Examples 1 through 3 shown in FIGS. 2D-2F, respectively, the medium started to shrink immediately after releasing the release paper and was deformed to be curled, which is attributed to the influence of heat from the electrical hot plate. Accordingly, it was confirmed that Examples 1 through 3 can dry the solvent ink while preventing a negative influence on the medium 50, as compared to Comparative Examples 1 through 3.

Printed results in each Example were evaluated by using a calorimeter. For this evaluation, in each of Examples 1 through 3, printing was conducted with each of respective process colors K, C, M, and Y and printing was conducted with each bicolor of respective Y+M, M+C, and C+Y. After the printing, the ink was dried by irradiation with microwaves. Also in each of Comparative Examples 1 through 3, printing was conducted with each color of K, C, M, Y, Y+M, M+C, and C+Y, but the ink was dried by the electrical hot plates.

After the printing, the calorimeter was used to obtain Lab values of printed results of the respective colors. The Lab values of the respective colors printed in Examples 1 through 3 and Comparative Examples 1 through 3 were suitable values. Further, color differences ΔE with regard to the respective colors between Examples 1-3 and Comparative Examples 1-3 using the same inks were calculated. For example, with regard to each of the colors K, C, M, Y, Y+M, M+C, and C+Y, a value calculated by subtracting the Lab value of Example 1 from the Lab value of Comparative Example 1 was obtained as ΔE, thereby calculating ΔE between Example 1 and Comparative Example 1. In the same manner, ΔE between Example 2 and Comparative Example 2 was calculated, and ΔE between Example 3 and Comparative Example 3 was calculated. Used as the calorimeter was Color Reflection Spectrodensitometer X-RITE 530LP (Model number: 530LP) manufactured by X-Rite, Incorporated (US).

Table 1 show calculation results of ΔEs. From these results, it is found that the ΔEs between Examples 1 through 3 and Comparative Example 1 through 3 are sufficiently small. It is also found that Examples 1 through 3 can conduct printing equivalent to Comparative Examples 1 through 3, while preventing influence over the medium when drying the ink.

TABLE 1

| ΔE | K | C | M | Y | Y + M | M + C | C + Y |
|---|---|---|---|---|---|---|---|
| Example 1 | 0.02 | 0.74 | 0.84 | 1.27 | 0.88 | 0.59 | 0.86 |
| Example 2 | 0.53 | 0.52 | 0.37 | 1.01 | 0.60 | 0.56 | 0.53 |
| Example 3 | 0.01 | 0.79 | 0.76 | 1.33 | 0.80 | 0.47 | 0.86 |

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. An inkjet printer using solvent ink containing an organic solvent and a colorant, said inkjet printer comprising:

an inkjet head configured to eject the solvent ink to a medium; and a microwave irradiation unit configured to irradiate the medium, to which the solvent ink was ejected, with microwaves, wherein the medium is not heated during drying of the solvent ink, wherein the organic solvent is incompatible with water; and wherein the solvent ink contains water within a range allowing mixing with the organic solvent, and the range of water in the solvent ink is from 0.1 to 20% of the solvent ink.

2. An inkjet printer as claimed in claim 1, wherein the medium is a fibrous medium.

3. An inkjet printer as claimed in claim 1, wherein:

the solvent ink contains a colorant of which color is developed by heating; and said microwave irradiation unit is configured to develop the color of the colorant by irradiating the medium with microwaves.

4. An inkjet printer as claimed in claim 2, wherein:

the solvent ink contains a colorant of which color is developed by heating; and said microwave irradiation unit is configured to develop the color of the colorant by irradiating the medium with microwaves.

5. An inkjet printer as claimed in claim 1, further comprising a chassis, wherein said microwave irradiation unit irradiates the medium with microwaves while the medium passes through an inside of said chassis.

6. An inkjet printer as claimed in claim 1, wherein said microwave irradiation unit is configured to send air to the medium when irradiating the medium with microwaves.

7. An inkjet printer as claimed in claim 1, wherein the organic solvent has a boiling point of 80° C. or more.

8. An inkjet printer as claimed in claim 1, wherein the solvent ink contains a resin.

9. An inkjet printer as claimed in claim 8, wherein the resin is poly vinyl chloride acetate, acrylic resin, polyester, or polyurethane.

10. An inkjet printer as claimed in claim 1, wherein the medium is a polyvinyl chloride sheet, a polyolefin sheet, or a fabric made of polyester fibers.

11. An inkjet printer using solvent ink containing an organic solvent and a colorant, said inkjet printer comprising:

means for ejecting the solvent ink onto a medium; and means for irradiating the medium, to which the solvent ink was ejected, with microwaves, wherein the medium is not heated during drying of the solvent ink, wherein the organic solvent is incompatible with water; and wherein the solvent ink contains water within a range allowing mixing with the organic solvent, and the range of water in the solvent ink is from 0.1 to 20% of the solvent ink.

12. An inkjet printer as claimed in claim 11, wherein the medium is a fibrous medium.

13. An inkjet printer as claimed in claim 11, wherein:

the solvent ink contains a colorant of which color is developed by heating; and said means for irradiating is configured to develop the color of the colorant by irradiating the medium with microwaves.

14. A printing method using solvent ink containing an organic solvent and a colorant, said method comprising:

ejecting the solvent ink to a medium using an inkjet method; and irradiating the medium, to which the solvent ink was ejected, with microwaves, wherein the medium is not heated during drying of the solvent ink, wherein the organic solvent is incompatible with water; and wherein the solvent ink contains water within a range allowing mixing with the organic solvent, and the range of water in the solvent ink is from 0.1 to 20% of the solvent ink.

15. A printing method as claimed in claim 14, wherein the medium is a fibrous medium.

16. A printing method as claimed in claim 15, wherein:

the solvent ink contains a colorant of which color is developed by heating; and said irradiating of the medium develops the color of the colorant by irradiating the medium with microwaves.

17. A printing method as claimed in claim 14, wherein:

the solvent ink contains a colorant of which color is developed by heating; and said irradiating of the medium develops the color of the colorant by irradiating the medium with microwaves.

18. A printing method as claimed in claim 14, wherein irradiation of the medium with microwaves occurs while passing the medium through an inside of a chassis.

19. A printing method as claimed in claim 14, further comprising sending air to the medium when irradiating the medium with microwaves.

20. A printing method as claimed in claim 14, wherein the organic solvent has a boiling point of 80° C. or more.

21. A printing method as claimed in claim 14, wherein the solvent ink contains a resin.

22. A printing method as claimed in claim 21, wherein the resin is poly vinyl chloride acetate, acrylic resin, polyester, or polyurethane.

23. A printing method as claimed in claim 14, wherein the medium is a polyvinyl chloride sheet, a polyolefin sheet, or a fabric made of polyester fibers.

* * * * *